US006848556B2

(12) United States Patent
Chen et al.

(10) Patent No.: US 6,848,556 B2
(45) Date of Patent: Feb. 1, 2005

(54) MOVABLE BARRIER OPERATOR DISCONNECT APPARATUS

(75) Inventors: Weixiong Chen, Elmhurst, NY (US); Leon J. Tate, Nesconset, NY (US)

(73) Assignee: The Chamberlain Group, Inc., Elmhurst, IL (US)

( * ) Notice: Subject to any disclaimer, the term of this patent is extended or adjusted under 35 U.S.C. 154(b) by 196 days.

(21) Appl. No.: 10/158,577

(22) Filed: May 30, 2002

(65) Prior Publication Data

US 2003/0221929 A1 Dec. 4, 2003

(51) Int. Cl.[7] ................................................ F16D 19/00

(52) U.S. Cl. ............................ 192/83; 192/89.2; 160/9; 160/140; 160/188; 160/224

(58) Field of Search .......................... 192/83, 32, 89.2; 160/188, 9, 138, 140, 151, 224

(56) References Cited

U.S. PATENT DOCUMENTS 2,742,280 A * 4/1956 Wilcox ....................... 160/189
4,852,706 A * 8/1989 Pietrzak et al. .......... 192/223.1
4,884,831 A * 12/1989 Emon .......................... 292/38
6,179,036 B1 * 1/2001 Harvey ....................... 160/188
6,253,824 B1 * 7/2001 Mullet et al. ............... 160/188
6,561,256 B2 * 5/2003 Mullet ........................ 160/191

OTHER PUBLICATIONS

International Search Report for PCT/US03/16258 mailed Feb. 19, 2004.

* cited by examiner

*Primary Examiner*—Saúl J. Rodriguez
(74) *Attorney, Agent, or Firm*—Fitch, Even, Tabin & Flannery

(57) ABSTRACT

A movable barrier operator (10) has a first disconnect mechanism (20) and a second disconnect mechanism (35) wherein either mechanism can be used to cause the output drive of the operator to be disengaged from the movable barrier to allow the movable barrier to be manually moved. In one embodiment, the second disconnect mechanism (35) is located distal to the operator itself such that the disengagement mechanism can be operated from an area external to the operator.

35 Claims, 5 Drawing Sheets

MOVABLE BARRIER OPERATOR DISCONNECT APPARATUS

TECHNICAL FIELD

This invention relates generally to movable barrier operators.

BACKGROUND

Movable barrier operators are well known in the art. Such operators typically respond to user commands (as provided through wired or wireless interfaces) to cause a corresponding movable barrier to move (usually such movement is back and forth between open and closed positions). Various movable barriers can be moved in such fashion, including vertically moving barriers (such as single-piece and segmented garage doors and rolling shutters of various kinds) and horizontally moving barriers (including both sliding and swinging gates and the like).

Such operators use a motive source, such as a motor, to cause such movement of a moving barrier. Sometimes, however, it is desirable to be able to move such a barrier without aid of the operator. For example, when emergency vehicles approach a gated community they need a method of entrance even if electricity is not available. It is known, for example, to provide a manual disconnect mechanism on a trolley that couples a garage door to a motor-driven chain to allow selective decoupling of the garage door from the garage door operator motor to thereby permit manual movement of the garage door. Such disconnect mechanisms, however, are typically accessible only from within the garage itself. Consequently, an otherwise authorized person located outside the garage may be unable to utilize such a disconnect mechanism and will therefore be unable to open the corresponding movable barrier by manual means. Similar problems occur with other varieties of movable barriers.

In one prior art approach, when electric power becomes unavailable, the corresponding movable barrier automatically becomes openable by manual means through use of a special non-gripping clutch. So configured, the drive mechanism will present little or no resistance to manual movement of the movable barrier. Although such an approach will allow opening of the barrier when power is absent, such an approach presents problems of its own. First, even unauthorized persons may now move the movable barrier when power is absent and hence gain access to the area beyond. Second, there may be times when manual entry is desired notwithstanding the availability of electric power; in such a case this prior art approach will not permit entry.

BRIEF DESCRIPTION OF THE DRAWINGS

The above needs are at least partially met through provision of movable barrier operator disconnect apparatus described in the following detailed description, particularly when studied in conjunction with the drawings, wherein.

Figure 1:
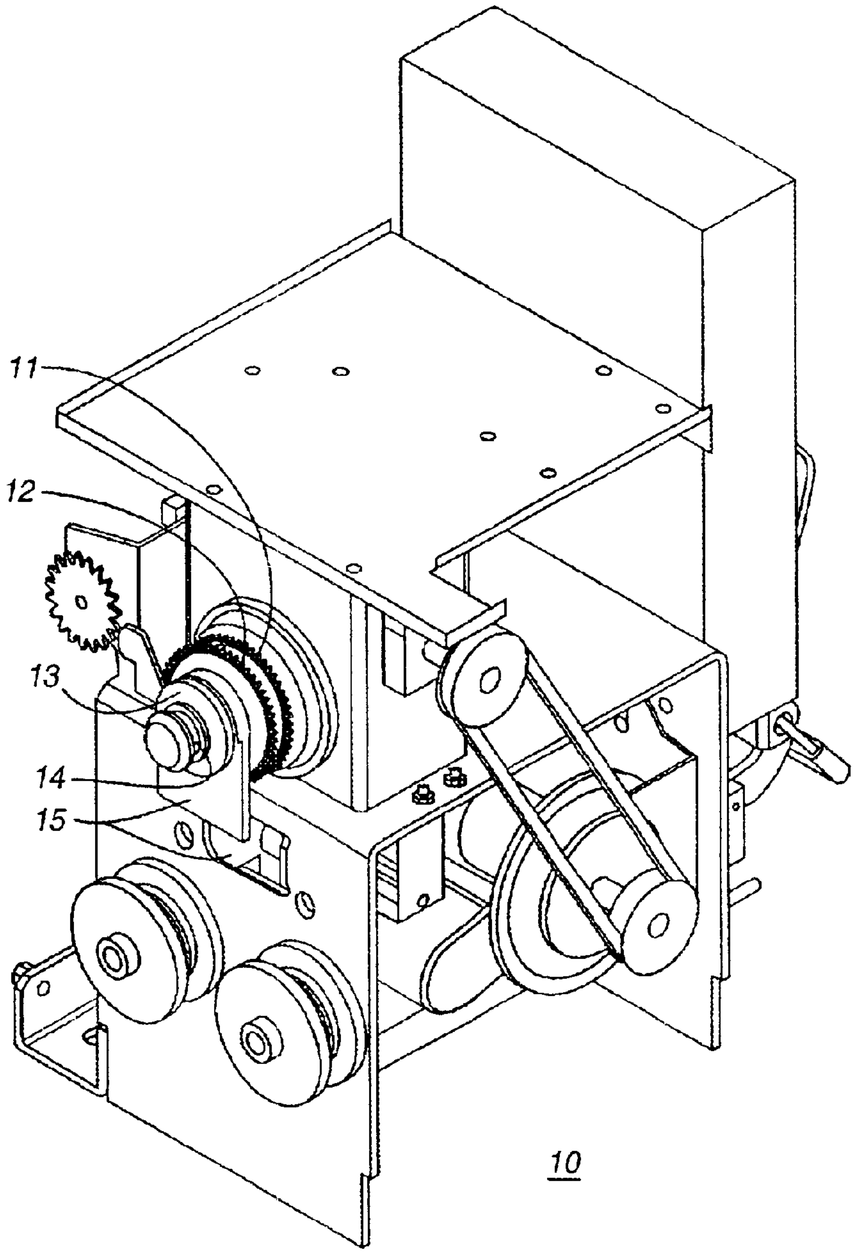
FIG. 1 comprises a first perspective view of a movable barrier operator as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements (such as housings, drive chains, and movable barriers) that are useful or necessary in a commercially feasible embodiment are typically not depicted in order to facilitate a less obstructed view of these various embodiments of the present invention.

DETAILED DESCRIPTION

Generally speaking, pursuant to these various embodiments, a movable barrier operator having an output drive that operably engages a movable barrier to effect selective movement of the barrier has a disconnect apparatus comprising both a first and a second mechanism designed and configured to selectively engage and disengage the output drive with respect to the movable barrier. In one embodiment, the first and second mechanisms are disposed such that the first mechanism is disposed on one side of the movable barrier and the second mechanism is at least partially disposed on another side of the movable barrier. In various embodiments, one or both of the first and second mechanisms comprise hand-operated mechanisms.

In a preferred embodiment, a drive chain sprocket that serves to couple the motor of the movable barrier operator to the movable barrier is movable between engaged and disengaged positions by the action of a hub. The hub is configured to ordinarily bias the drive chain sprocket towards an engaged position. This bias can be overcome, however, by the action of an actuator arm and a corresponding transfer assembly. The actuator arm can pivot in response to movement of either of two cables, wherein a first one of the cables couples to a pivotable handle that comprises a part of the first mechanism and wherein a second one of the cables couples to a hand-operable handle that comprises a part of the second mechanism.

So configured, in a preferred embodiment, both the first and second mechanisms must be positioned in an enable mode in order for the hub to engage the drive chain sprocket and thereby couple the motor to the movable barrier.

The embodiments taught herein provide for access to a mechanism for decoupling the drive mechanism of a movable barrier operator from the movable barrier itself from either side of the movable barrier. As a result, authorized persons on either side of the barrier will have the opportunity to nevertheless effect manual opening of the barrier when such is desired. Furthermore, these embodiments are relatively inexpensive, relatively intuitive to operate, reliable, and readily protected from unauthorized usage. In many instances this functionality can also be retrofit to existing installed operators without undue difficulty.

For purposes of illustration, the embodiments presented below are based upon a movable barrier operator as is used to effect selective movement of a sliding gate such as one finds at driveway entrances and the like. These selections are for purposes of illustration only and the invention should not be considered to be limited to such a context; in fact, these teachings have wide applicability with various kinds of movable barrier operators and movable barriers.

Referring now to FIG. 1, a movable barrier operator 10 is generally depicted (for purposes of clarity, the operator is shown sans housing in the various views provided). The operator 10 has a limit system drive sprocket 11 that works in tandem with a drive chain sprocket 12 to provide motive power to a corresponding movable barrier (not shown) in accordance with well understood prior art practice to cause selective movement of the movable barrier between open and closed positions and vice versa. In this embodiment, a hub 13 is positioned proximal to the drive chain sprocket 12 and is disposed substantially co-axially therewith. The hub 13 is capable of axial movement but is ordinarily urged towards the drive chain sprocket 12 through the action of a co-axially aligned spring 14. So configured, and again in accordance with well understood technique, the hub 13 will urge the drive chain sprocket 13 into cooperative engagement with the limit system drive sprocket 11 such that motive power from the movable barrier operator 10 is readily transferred via a drive chain (not shown) to the movable barrier.

In this embodiment, a transfer assembly 15 also operably engages the hub 13. Additional details regarding this configuration are provided below.

Figure 2:
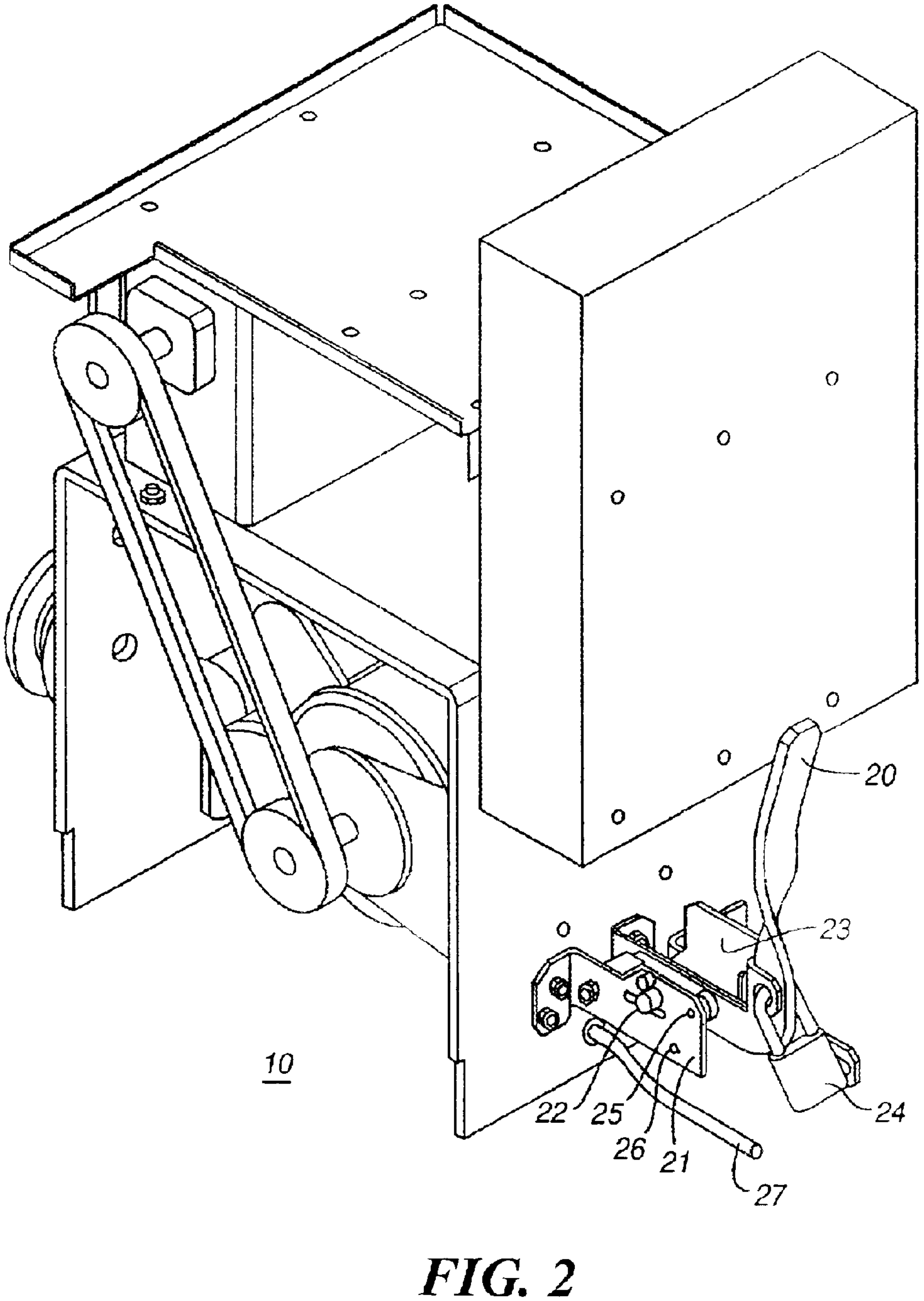
FIG. 2 comprises a second perspective view of the movable barrier operator as configured in accordance with an embodiment of the invention.

Referring now to FIG. 2, an opposing perspective view of the movable barrier operator 10 depicts a handle 20 that comprises a part of a first disconnect mechanism. A handle bracket 21 is affixed with respect to the frame of the operator 10 and the handle 20 is pivotably coupled to the handle bracket 21 by use of a pivot pin 22. So configured, the handle 20 can readily be pivoted about the pivot pin 22 such that the handle 20 can be readily moved downwardly. In this embodiment, another bracket 23 has been provided as well. This bracket 23 can also serve to support the pivot pin 22 and further can have a hole disposed therethrough. When the hole in this bracket 23 registers with a hole as provided in the handle 20, a lock 24 can be disposed therethrough. This, of course, allows the handle 20 to be locked with the movable barrier operator in the engaged mode such that unauthorized persons cannot readily alter the engaged status of the operator 10. (This bracket 23 may also have another extension and another corresponding hole such that the handle 20 can also be similarly locked when in the disengaged position.)

If desired, a latching mechanism to aid in retaining the handle 20 in either the engaged or disengaged position is provided as well. Such a latching mechanism is particularly useful when the handle 20 is moved to a desired position and the lock 24 is not utilized. In this embodiment, the latching mechanism is comprised of detents 25 and 26 that cooperate in a known manner with corresponding features on the handle 20 itself. These detents 25 and 26 should preferably be of sufficient size as to reliably hold the handle 20 in place without also requiring undue force to move the handle 20 out of engagement with the detent mechanisms.

Also viewable in this figure is an armored sheath 27 that is positioned beneath the handle 20. This armored sheath 27 comprises a part of a second disconnect mechanism as will be disclosed in more detail below. (In a typical installation, the armored sheath 27 would extend considerably further than is depicted—the length here has been shortened for purposes of clarity and focus.)

Figure 3:
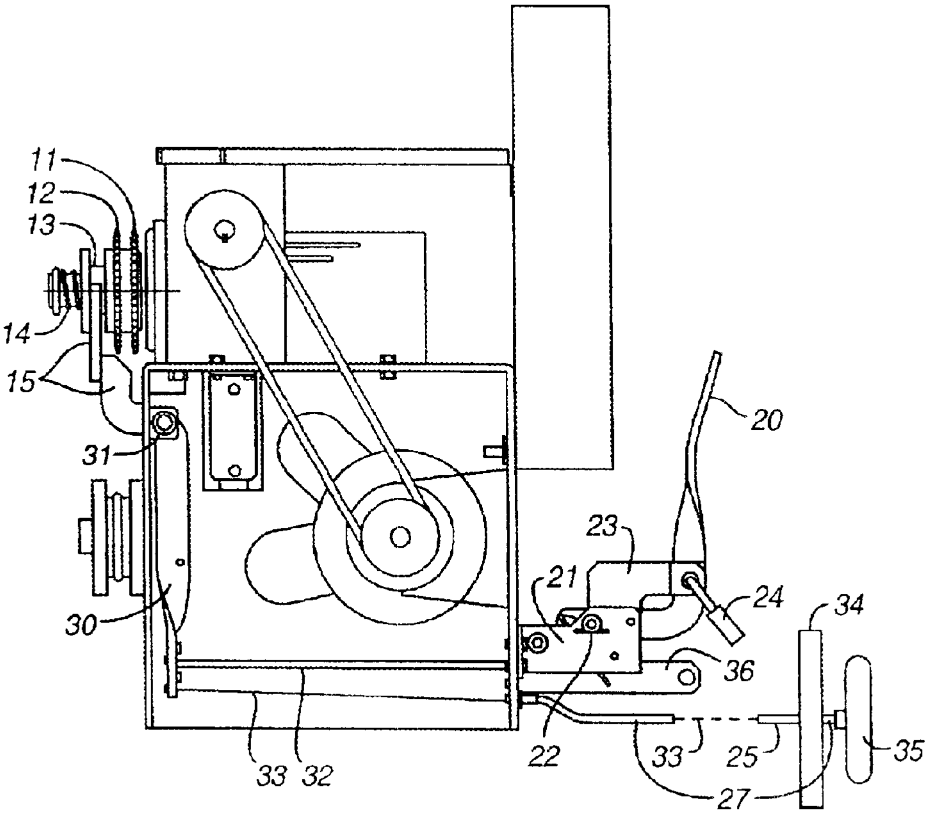
FIG. 3 comprises a side elevational view of the movable barrier operator in an engaged mode as configured in accordance with an embodiment of the invention.

Referring now to FIG. 3, it can be seen that the aforementioned transfer assembly 15 in turn couples to an actuator arm 30. The actuator arm 30 and transfer assembly 15 are coupled as one and are further pivotally disposed about a pivot pin 31, the pivot pin being affixed in position by an appropriate bracket that is connected to the frame of the operator 10. So configured, when the actuator arm 30 is pivoted away from the frame of the operator 10, the transfer assembly 15 as coupled thereto will in turn move the hub 13 against the bias of the spring 14 to thereby induce disengagement of the drive chain sprocket 12 with respect to the limit system drive sprocket 11. Conversely, it should also be evident that, under ordinary circumstances, the spring 14 that acts upon the hub 13 also acts upon the transfer assembly 14 and hence the actuator arm 30 to thereby urge the actuator arm 30 towards proximity with the operator frame.

It can also been seen in this view that two cables 32 and 33 are coupled to the actuator arm 30. The first cable 32 is coupled to the pivoting handle 20 described earlier. The second cable 33 passes through the armored sheath 27 to a terminus 34 (which can be an appropriate bracket or the like to affix the distal end of the armored sheath 27). The cable 33 extends therefrom and then couples to an appropriate mechanism (in this embodiment, a simple hand-operable handle 35—other mechanisms, including electrically operated motive devices can be used as desired and appropriate to a given application).

So configured, when either cable 32 or 33 is drawn taut, the actuator arm 30 and corresponding transfer assembly 15 will pivot and thereby draw the hub 13 and drive chain sprocket 12 away from operative engagement with the limit system drive sprocket 11. When this happens, the output drive of the movable barrier operator is effectively disengaged from the movable barrier such that continued operation of the output drive will have no effect upon the position of the movable barrier and, conversely, the movable barrier can be moved without resistance from the output drive of the movable barrier operator.

Figure 4:
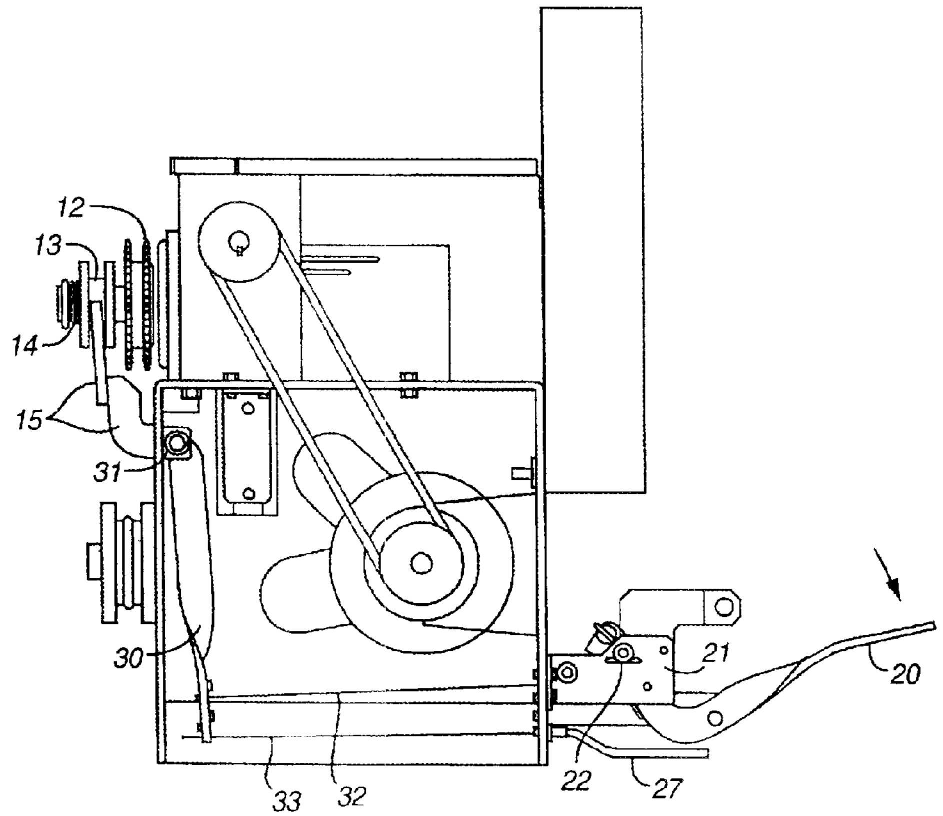
FIG. 4 comprises a side elevational view of the movable barrier operator in a first disengaged mode as configured in accordance with an embodiment of the invention.
Figure 5:
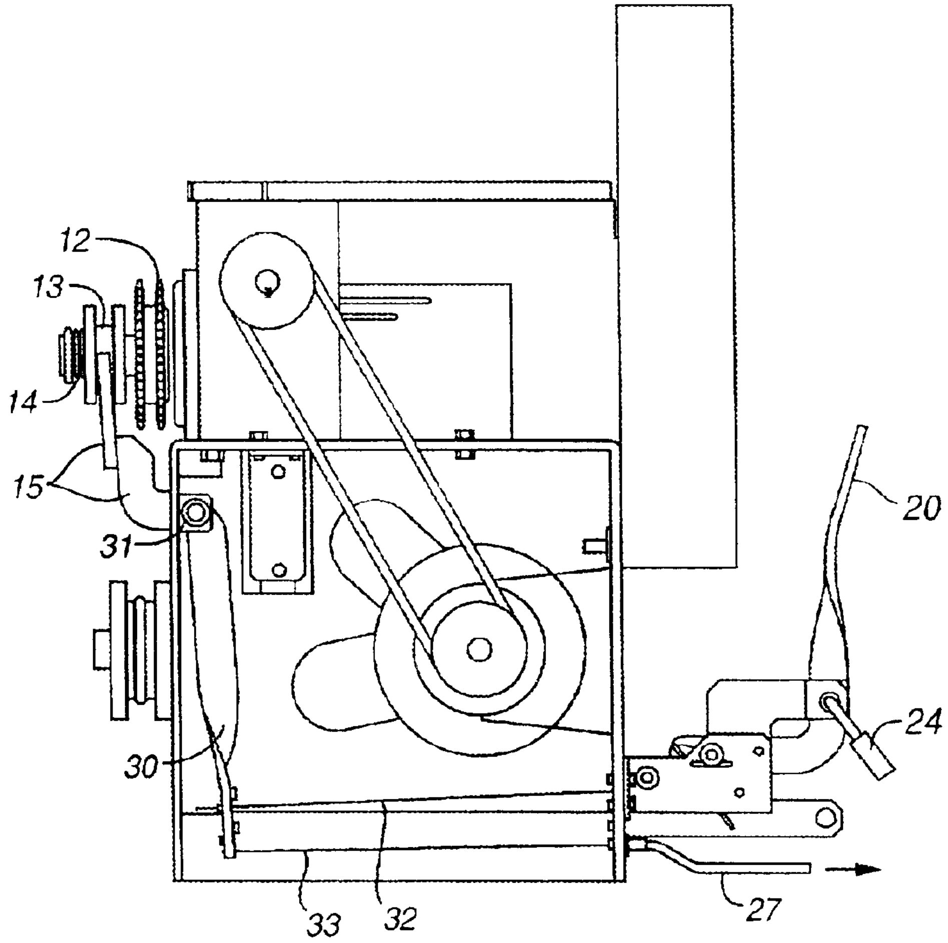
FIG. 5 comprises a side elevational view of the movable barrier operator in a second disengaged mode as configured in accordance with an embodiment of the invention.

In this embodiment, each cable 32 and 33 is pulled in a different way to so effect disengagement of the output drive from the movable barrier. First, and referring now to FIG. 4, the handle 20 can be pivoted downwardly to thereby pull its cable 32 and hence the actuator arm 30. When this happens, the remaining cable 33 remains slack. Second (and referring now to FIG. 5), the cable 33 that passes through the armored sheath 27 can be pulled and thereby induce the same action and reaction. When this happens, the upper cable 32 will remain slack.

So configured, either cable can be manipulated to cause disengagement of the output drive with respect to the movable barrier. For engagement to be effected, however, both cables 32 and 33 must be released. This means that both handles 20 and 35 must be moved to their engaged positions.

In an ordinary installation, the movable barrier operator 10 will be disposed inwardly of the movable barrier, meaning that when the movable barrier is in a closed position, an unauthorized person will not have easy access to the operator. The armored sheath 27 will typically be used to run the second cable 33 to an outside position. That is, the terminus of the armored sheath 27 will be on the opposite side of the movable barrier when the barrier is in a closed position. Therefore, it will usually be preferred to locate the terminus end of the armored sheath 27 and the corresponding handle 35 within a locked pedestal or other secured housing. Such provisions will deny ready access to the disengagement mechanism to unauthorized personnel. Further, by using armored sheathing, an unauthorized person will not be able to otherwise gain easy access to the second cable 33.

Figure 6:
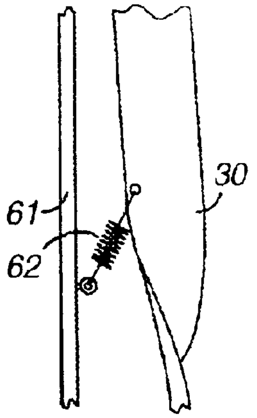
FIG. 6 comprises a detailed side elevational view of an actuator arm and spring assembly as configured in accordance with another embodiment of the invention.

When either of the cables 32 and 33 are moved to a disengaged position through appropriate manipulation of the handles 20 or 35, movement of the corresponding handle back to an engaged position may, or may not, ensure that the actuator arm 30 moves back to the engaged position as well. In many instances, the bias of the hub spring 14 will be sufficient to ensure that these components each move to the appropriate position when the handles are returned to their engaged disposition. If, however, such is not the case for whatever reason, another bias member such as a spring 62 as depicted in FIG. 6 can be disposed between the actuator arm 30 and the operator frame 61 or other bracket as may be provided. So configured, both the hub spring 14 and this secondary spring 62 will serve to urge the actuator arm 30 back to an engaged position.

Figure 7:
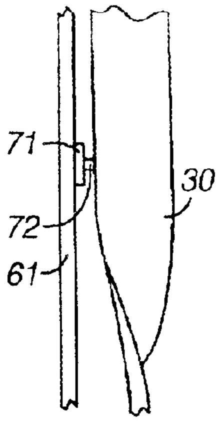
FIG. 7 comprises a detailed side elevational view of an actuator arm and switch assembly as configured in accordance with yet another embodiment of the invention.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, with reference to FIG. 7, a switch 71 having an actuation mechanism 72 that is positioned to be ordinarily closed when the actuator arm 30 is in the engaged position can be provided. So configured, an electric signal can be provided that corresponds to the engaged or disengaged position of the actuator arm 30. Such a signal can, in turn, be used to provide a local and/or remote alert signal, power control of the operator, status indicia, or serve to drive an event log as appropriate to a given application.

We claim:

1. A disconnect apparatus for use with a powered movable barrier operator having an output drive that operably engages a movable barrier to effect selective movement of the movable barrier, comprising:

a first mechanism configured to selectively engage and disengage the output drive and the movable barrier;

a second mechanism configured to selectively engage and disengage the output drive and the movable barrier.

2. The disconnect apparatus of claim 1 wherein both the first and the second mechanism must be set to engage the output drive with the movable barrier to facilitate powered movement of the movable barrier by the powered movable barrier operator.

3. The disconnect apparatus of claim 1 wherein at least one of the first and second mechanism is a hand-operated mechanism.

4. The disconnect apparatus of claim 3 wherein both of the first and second mechanisms are hand-operated mechanisms.

5. The disconnect apparatus of claim 1 wherein the first mechanism is disposed proximal to the powered movable barrier operator.

6. The disconnect apparatus of claim 5 wherein the second mechanism is disposed distal to the powered movable barrier operator.

7. The disconnect apparatus of claim 6 wherein the powered movable barrier operator is disposed on a first side of the movable barrier and at least a portion of the second mechanism is disposed on another side of the movable barrier.

8. The disconnect apparatus of claim 7 wherein the second mechanism comprises a hand-operated mechanism.

9. The disconnect apparatus of claim 8 wherein the second mechanism is mechanically coupled to the powered movable barrier operator.

10. The disconnect apparatus of claim 1 and further comprising a pivoting member that is operably coupled to both the first and the second mechanism.

11. The disconnect apparatus of claim 10 wherein the first mechanism couples to the pivoting member via a first cable.

12. The disconnect apparatus of claim 11 wherein the second mechanism couples to the pivoting member via a second cable.

13. The disconnect apparatus of claim 10 wherein the pivoting member has a first position corresponding to engagement of the powered movable barrier operator and the movable barrier and a second position corresponding to disengagement of the powered movable barrier operator.

14. The disconnect apparatus of claim 13 wherein the pivoting member is biased towards the first position.

15. The disconnect apparatus of claim 14 wherein the pivoting member is biased towards the first position by at least a first spring.

16. The disconnect apparatus of claim 15 wherein the first spring is directly connected to the pivoting member.

17. The disconnect apparatus of claim 15 wherein the pivoting member is further biased towards the first position by at least a second spring.

18. The disconnect apparatus of claim 17 wherein the first spring is directly connected to the pivoting member and the second spring is not directly connected to the pivoting member.

19. The disconnect apparatus of claim 18 and further comprising a drive hub that is operably coupled to the pivoting member and which drive hub is directly acted upon by the second spring.

20. The disconnect apparatus of claim 1 wherein:

the first mechanism comprises first engage/disengage means for selectively engaging and disengaging the powered movable barrier operator with and from the movable barrier, the second mechanism comprises second engage/disengage means for selectively engaging and disengaging the powered movable barrier operator with and from the movable barrier.

21. The disconnect apparatus of claim 20 wherein the first and second engage/disengage means each includes hand interface means for allowing a human operator to select an engaged and disengaged mode of operation.

22. A disconnect apparatus for use with a powered movable barrier operator having an output drive that operably engages a movable barrier to effect selective movement of the movable barrier, comprising:

a pivoting member operably coupled to the output drive and being movable between an engaged position wherein the output drive is engaged with the movable barrier and a disengaged position wherein the output drive is disengaged from the movable barrier;

a first mechanism that is disposed proximal to the output drive, comprising:

a hand-operable pivoting handle that is movable between a first position and a second position;

a first cable coupling the hand-operable pivoting handle to the pivoting member, such that when the hand-operable pivoting handle is moved to the first position the first cable does not exert substantial force on the pivoting member and when the hand-operable pivoting handle is moved to the second position the first cable exerts a force on the pivoting member sufficient to move the pivoting member to the disengaged position;

a second mechanism that is disposed distal to the output drive, comprising:

a user-interface that is movable between a third position and a fourth position;

a second cable coupling the user-interface to the pivoting member, such that when the user-interface is moved to the third position the second cable does not exert substantial force on the pivoting member and when the user-interface is moved to the fourth position the second cable exerts a force on the pivoting member sufficient to move the pivoting member to the disengaged position.

23. The disconnect apparatus of claim 22 wherein the output drive is disposed on a first side of the movable barrier and the second mechanism is disposed on another side of the movable barrier.

24. The disconnect apparatus of claim 23 wherein at least portions of the second cable are disposed within armored conduit.

25. The disconnect apparatus of claim 22 wherein the pivoting member is ordinarily biased towards the engaged position.

26. The disconnect apparatus of claim 25 wherein the pivoting member is ordinarily biased towards the engaged position by at least a first spring.

27. The disconnect apparatus of claim 26 wherein the pivoting member is ordinarily biased towards the engaged position by a plurality of springs.

28. The disconnect apparatus of claim 22 wherein the first mechanism further includes a first latch for retaining the hand-operable pivoting handle in the first position when the hand-operable pivoting handle is in the first position.

29. The disconnect apparatus of claim 28 wherein the first latch comprises a detent mechanism.

30. The disconnect apparatus of claim 28 wherein the first mechanism further includes a second latch for retaining the hand-operable pivoting handle in the second position when the hand-operable pivoting handle is in the second position.

31. The disconnect apparatus of claim 30 wherein the second latch comprises a detent mechanism.

32. The disconnect apparatus of claim 22 and further comprising signaling means for signaling when the movable barrier has been disengaged from the output drive.

33. An apparatus for use with a powered movable barrier operator that operably engages a movable barrier to effect selective movement of the movable barrier, comprising:

first means for selectively disengaging the powered movable barrier operator and the movable barrier; and second means for selectively disengaging the powered movable barrier operator and the movable barrier.

34. The apparatus of claim 33 and further comprising disengagement means operably coupled to at least one of the powered movable barrier operator and the movable barrier for effecting disengagement of the powered movable barrier operator from the movable barrier.

35. The apparatus of claim 34 wherein the first means and the second means are both operably coupled to the disengagement means.

* * * * *